(12) United States Patent
Ge

(10) Patent No.: US 8,224,249 B2
(45) Date of Patent: Jul. 17, 2012

(54) WIRELESS CONFERENCE SYSTEM

(75) Inventor: Chi-Sheng Ge, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/033,617

(22) Filed: Feb. 24, 2011

(65) Prior Publication Data

US 2012/0009907 A1 Jan. 12, 2012

(30) Foreign Application Priority Data

Jul. 8, 2010 (CN) .......................... 2010 1 0219598

(51) Int. Cl.
*H04B 7/00* (2006.01)
*H04M 3/42* (2006.01)
(52) U.S. Cl. ...................... 455/41.2; 455/416
(58) Field of Classification Search ................ 455/41.2, 455/416
See application file for complete search history.

(56) References Cited

U.S. PATENT DOCUMENTS

| 2002/0193073 A1* | 12/2002 | Fujioka ........................... 455/41 |
| 2007/0042762 A1* | 2/2007 | Guccione ...................... 455/416 |
| 2009/0264114 A1* | 10/2009 | Virolainen et al. ........... 455/416 |

* cited by examiner

*Primary Examiner* — Nick Carsaro
*Assistant Examiner* — Joel Ajayi
(74) *Attorney, Agent, or Firm* — Altis Law Group, Inc.

(57) ABSTRACT

A wireless conference system includes a master device and a slave device. The master device includes a master user interface, a master BLUETOOTH unit, a master memory unit, and a command converting unit. The master user interface includes a master screen. The master memory unit saves a conference document. The slave device includes a slave user interface, a slave BLUETOOTH unit, and an executing unit. The slave memory unit saves a copy of the conference document. Operation commands to operate the conference document are input through the master user interface. The command converting unit converts the operation commands to corresponding slave commands. The corresponding slave commands are transmitted to the slave device by the master BLUETOOTH unit and the slave BLUETOOTH unit. The executing unit executes the corresponding slave commands to operate the copy of the conference document.

12 Claims, 3 Drawing Sheets

WIRELESS CONFERENCE SYSTEM

BACKGROUND

1. Technical Field

The present disclosure relates to conference systems and, particularly, to a wireless conference system.

2. Description of Related Art

Wireless local area network (WLAN) such as Wireless Fidelity (WiFi) is commonly used in a short distance conference system. However, the cost for establishing WLAN is high, thus increasing the cost of the short distance conference system.

Therefore, it is desirable to provide a wireless conference system, which can overcome the above-mentioned limitation.

DETAILED DESCRIPTION

Figure 1:
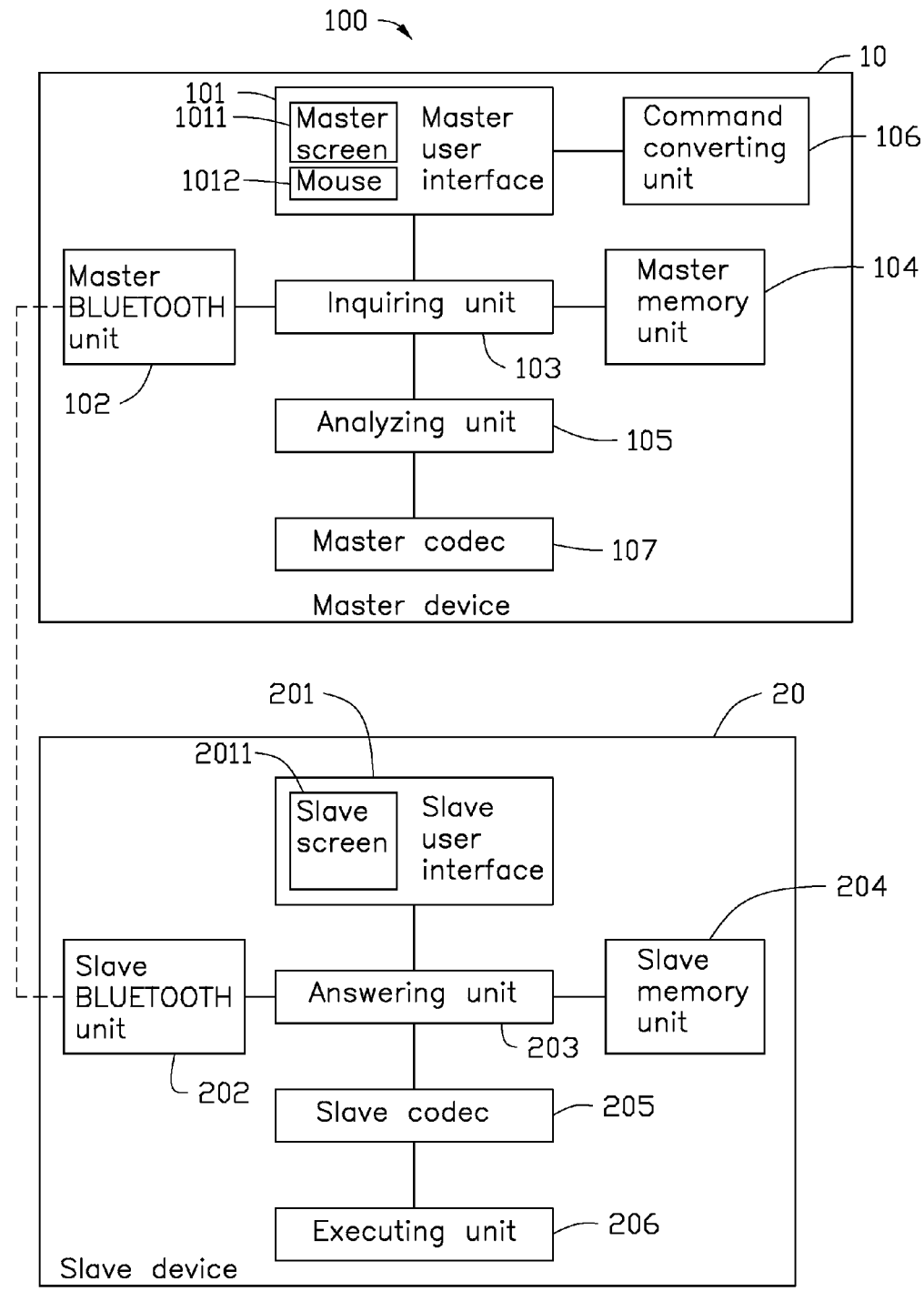
FIG. 1 is a block diagram of a wireless conference system, according to an exemplary embodiment, the wireless conference system including a master device and a slave device.

Referring to FIG. 1, a wireless conference system 100, according to an exemplary embodiment, includes a master device 10 and at least a slave device 20. The master device 10 can be a computer, a cell phone, or a personal digital assistant (PDA). In the present embodiment, the master device 10 is a computer. The slave device 20 can be a computer, a cell phone, or a personal digital assistant (PDA). In the present embodiment, the slave device 20 is a cell phone.

The master device 10 includes a master user interface 101, a master BLUETOOTH unit 102, an inquiring unit 103, a master memory unit 104, an analyzing unit 105, a command converting unit 106, and a master codec 107.

The master user interface 101 includes a master screen 1011, a mouse 1012, and a keyboard (not shown). The master user interface 101 is configured for inputting a start command to start the master BLUETOOTH unit 102. The master user interface 101 is also configured for inputting operation commands to operate a conference document saved in the master memory unit 104. The master BLUETOOTH unit 102 is connected to the master user interface 101. The master BLUETOOTH unit 102 is configured for generating a communication request and transmitting BLUETOOTH signals. The inquiring unit 103 is connected to the master BLUETOOTH unit 102 and is configured for generating an inquiry message. The master memory unit 104 is connected to the inquiring unit 103 and is configured for saving the conference document and a first resolution of the master screen 1011. In the present embodiment, the first resolution is 1024 pixels multiplied by 768 pixels. The analyzing unit 105 is connected to the inquiring unit 103. The command converting unit 106 is connected to the master user interface 101 and configured for converting the operation commands to the corresponding slave commands. The master codec 107 is connected to the analyzing unit 105 and is configured for encoding the inquiry message and the corresponding slave commands into BLUETOOTH signals.

The slave device 20 includes a slave user interface 201, a slave BLUETOOTH unit 202, an answering unit 203, a slave memory unit 204, a slave codec 205, and an executing unit 206.

The slave user interface 201 includes a slave screen 2011 and a keyboard (not shown). The slave user interface 201 is configured for inputting a starting command to start the slave BLUETOOTH unit 202 and inputting an accepting command to accept the communication request when the slave BLUETOOTH 202 receives the communication request. The slave BLUETOOTH unit 202 is connected to the slave user interface 201 and is configured for generating a response message corresponding to the communication request and transmitting BLUETOOTH signals. The answering unit 203 is connected to the slave BLUETOOTH unit 202 and is configured for generating an answer message corresponding to the inquiry message. The slave memory unit 204 is connected to the answering unit 203 and is configured for saving a second resolution of the slave screen 2011. In the present embodiment, the second resolution is 256 pixels multiplied by 192 pixels. The slave codec 205 is connected to the answering unit 203 and is configured for encoding the answer message into the BLUETOOTH signals. The slave codec 205 is also configured for decoding the corresponding slave commands received from the master device 10. The executing unit 206 is connected to the slave codec 205 and is configured for executing the corresponding slave commands decoded by the slave codec 205.

Figure 2:
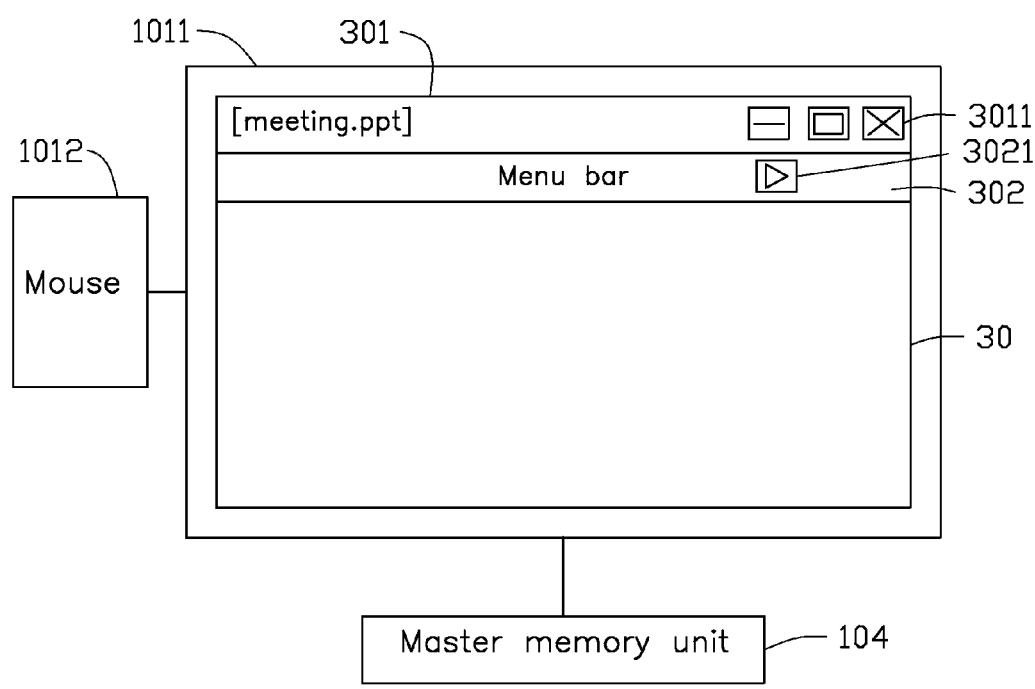
FIG. 2 shows that the master device displays a conference document.
Figure 3:
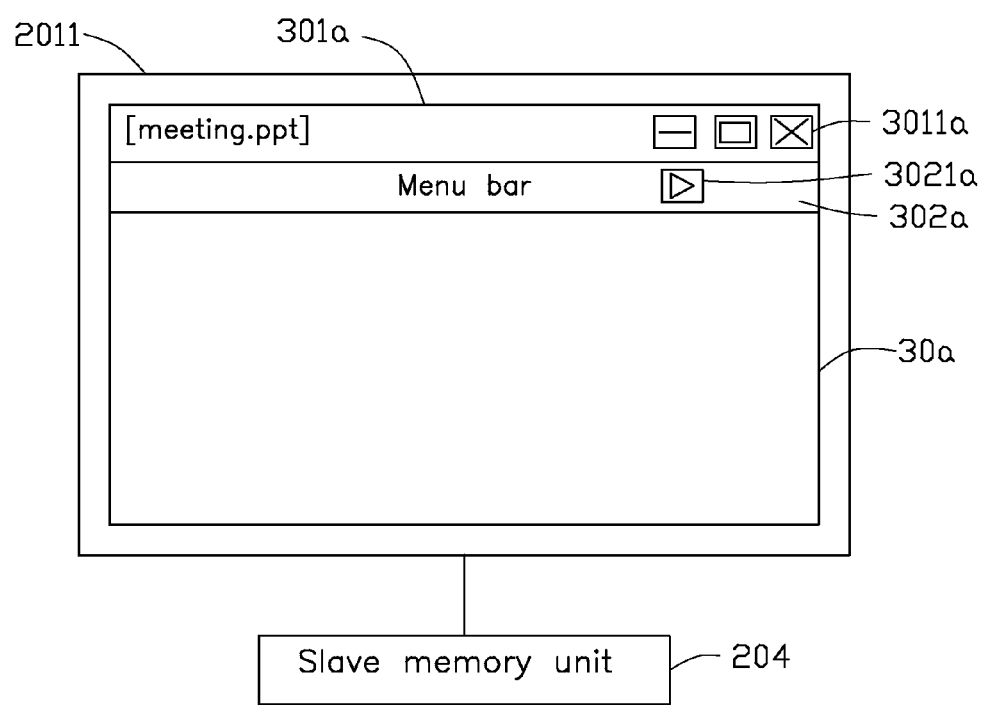
FIG. 3 shows that the slave device displays the copy of the conference document shown in FIG. 2.

Referring to FIGS. 1 to 3, in use, a start command is input through the master interface 101 to start the master BLUETOOTH unit 102. A communication request is generated by the master BLUETOOTH unit 102. A start command is input to start the slave BLUETOOTH unit 202 through the slave user interface 201. The communication request is transmitted to the slave device 20 by the master BLUETOOTH unit 102 and is received by the slave BLUETOOTH unit 202. Then, an accepting command is input through the slave user interface 201 to accept the communication request. A response message is generated by the slave BLUETOOTH unit 202 and transmitted to the master device 10 by the slave BLUETOOTH unit 202. Thus, a wireless link between the master device 10 and the slave device 20 via the master BLUETOOTH unit 102 and the slave BLUETOOTH unit 202 is established.

Then the master device 10 transmits a copy of the conference document to the slave device 20 by the master BLUETOOTH unit 102. The copy of the conference document is received by the slave BLUETOOTH unit 202 and then is saved in the slave memory unit 204. Thus, the conference document saved in the master memory unit 104 and the copy of the conference document saved in the slave memory unit 204 with the same conference document name and format. In the present embodiment, the conference document and the copy of conference document are named "meeting.ppt" and in Microsoft PowerPoint (PPT) format.

Then an inquiry message for obtaining the second resolution saved in the slaved memory unit 204 is generated by the inquiry unit 103. The inquiry message is transmitted to the master codec 107, encoded by the master codec 107 into BLUETOOTH signals, and then transmitted to the slave device 20 by the master BLUETOOTH unit 102. The inquiry message is received by the slave BLUETOOTH unit 202, and transmitted to the slave codec 205, and decoded by the slave codec 205. Then the inquiry message is transmitted to the answering unit 203. The answering unit 203 fetches the second resolution from the slave memory unit 204 according to the inquiry message. The answering unit 203 generates an answer message containing the second resolution. The answer message is encoded by the slave codec 205 into BLUETOOTH signals and is transmitted to the master device 10 by the slave BLUETOOTH unit 202. The answer message is received by the master BLUETOOTH unit 102 and is transmitted to the master codec 107 and decoded by the master codec 107. Then the answer message is transmitted to the analyzing unit 105. The second resolution is extracted from the answer message decoded by the master codec 107. The analyzing unit 105 calculates a resolution ratio between the second resolution and the first resolution. In the present embodiment, the first resolution is 256 pixels multiplied by 192 pixels, the second resolution is 1024 pixels multiplied by 768 pixels, namely, the resolution ratio between the second resolution and the first resolution is ¼. The resolution ratio is saved in the master memory unit 104.

The conference document saved in the master memory unit 104 can be operated by inputting operation commands through the master user interface 101, for example, using the mouse 1012. The operation commands include to open the conference document, to play the conference document, or to close the conference document.

First, an operation command to open the conference document is input through the master user interface 101. The conference document is displayed on the master screen 1011 in full screen. The conference document is shown in a window 30. The window 30 includes a title bar 301 and a menu bar 302. The title bar 301 includes a close button 3011. The menu bar 302 includes a play button 3021. The operation command to open the conference document is converted to a corresponding command to open the copy of the conference document saved in the slave memory unit 204. The corresponding command to open the copy of the conference document contains the name and the format of the copy of conference document, and an action of opening. The corresponding command to open the copy of the conference document is encoded by the master codec 107 in BLUETOOTH signals and then is transmitted by the master BLUETOOTH unit 102. The corresponding command to open the copy of the conference document is received by the slave BLUETOOTH unit 202 and is decoded by the slave codec 205. Then the corresponding operation to open the copy of the conference document is decoded by the slave codec 205 and is transmitted to the executing unit 206. The copy of the conference document is opened by the executing unit 206 according to the corresponding command to open the copy of the conference document decoded by the slave codec 205. The copy of the conference document is display on the slave screen 2011 in full screen. The copy of the conference document is shown in a window 30a. The window 30a includes a title bar 301a and a menu bar 302a. The title bar 301a includes a close button 3011a. The menu bar 302a includes a play button 3021a.

When the user of the master device 10 wants to play the conference document displayed on the master screen 1011, the play button 3021 is selected. Thus, an operation command to play the conference document is input through the master user interface 101. In one embodiment, the mouse 1012 is applied to select the play button 3021. The position of the play button 3021 on the master screen 1011 is at 512 pixels multiplied by 24 pixels. The mouse 1012 is moved to the position of 512 pixels multiplied by 24 pixels to clicks the play button 3021. Then the conference document is played on the master screen 1011. Corresponding position of the play button 3021a in the slave screen 2011 is calculated by the analyzing unit 105 according to the resolution ratio. The corresponding position on the slave screen 2011 is equal to the resolution ratio multiplied by the position of play button 3021. The corresponding position of the play button 3021a is (512 pixels multiplied by 24 pixels) multiplied by ¼, namely, the corresponding position of the play button 3021a on the slave screen 2011 is 128 pixels multiplied by 6 pixels. The operation command to play the conference document displayed on the master screen 1011 is converted to a corresponding command to play the copy of the conference document displayed on the slave screen 2011 by the command converting unit 106. The corresponding command to play the copy of the conference document contains the corresponding position of the play button 3021a and an action of playing.

Then corresponding command to play the copy of the conference document is encoded by the master codec 107 in BLUETOOTH signals and is transmitted by the master BLUETOOTH unit 102. The corresponding command to play the copy of the conference document is received by the slave BLUETOOTH unit 202 and is decoded by the slave codec 205. Then the corresponding operation to play the copy of the conference document is transmitted to the executing unit 206. The play button 3021a is selected by the executing unit 206 according to the corresponding command to play the copy of the conference document decoded by the slave codec 205. The copy of the conference document displayed in slave screen 2011 is played.

When the user of the master device 10 closes the conference document displayed on the master screen 1011, the close button 3011 is selected. An operation command to close the conference document displayed on the master screen 1011 is input through the master user interface 101. In one embodiment, the mouse 1012 is applied to select the play button 3011. The position of the play button 3011 on the master screen 1011 is at 896 pixels multiplied by 20 pixels. The mouse 1012 is moved to the position of 896 pixels multiplied by 20 pixels to click the close button 3021. Then the conference document displayed on the master screen 1011 is closed. A corresponding position of the close button 3011a in the slave screen 2011 is calculated by the analyzing unit 105 according to the resolution ratio. The corresponding position of the play button 3011a on the slave screen 2011 is equal to the resolution ratio multiplied by the position of the play button 3021. The corresponding position is (896 pixels multiplied by 20 pixels) multiplied by ¼, namely, the corresponding position of the close button 3011a on the slave screen 2011 is 224 pixels multiplied by 5 pixels. The operation command to close the conference document displayed on the master screen 1011 is converted to a corresponding command to close the copy of the conference document displayed on the slave screen 2011 by the command converting unit 106. The corresponding command to close the copy of the conference document contains the corresponding position of the close button 3011a and an action of closing.

Then corresponding command to close the copy of conference document is encoded by the master codec 107 in BLUETOOTH signals and is transmitted by the master BLUETOOTH unit 102. The corresponding command to close the copy of the conference document is received by the slave BLUETOOTH unit 202 and is decoded by the slave codec 205. Then the corresponding command to close the copy of the conference document is decoded by the slave codec 205 and is transmitted to the executing unit 206. The close button 3011a is selected by the executing unit 206 according to the corresponding command to play the copy of the conference document decoded by the slave codec 205. The conference document displayed in slave screen 2011 is closed.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A wireless conference system, comprising:
a master device, the master device comprising a master user interface, a master BLUETOOTH unit, an inquiring unit, a master codec, a master memory unit, an analyzing unit, and a command converting unit, the master user interface comprising a master screen, the master memory unit being configured to save a conference document and a first resolution of the master screen; and
a slave device comprising a slave user interface, a slave unit, a slave codec, a slave memory unit, an answering unit, and an executing unit, the slave user interface comprising a slave screen, the slave memory unit being configured to save a second resolution of the slave screen and the copy of the conference document having the same name and format with the conference document;
wherein the master BLUETOOTH unit is configured to establish a wireless link with the slave BLUETOOTH unit, the inquiring unit is configured to generate an inquiry message obtaining the second resolution, the answering unit is configured to receive the inquiry message and generate an answer message containing the second resolution in response to the inquiry message, the analyzing unit is configured to receive the answer message and extract the second resolution from the answer message and calculate a resolution ratio of the second resolution and the first resolution, and the master memory unit is configured to save the resolution ratio;
wherein operation commands are inputted by clicking a button on the master screen, the analyzing unit calculates a position of a corresponding button to be selected on the slave screen by multiplying data of the position of button on the master screen with the resolution ratio, the command converting unit is configured to convert the operation commands input from the master screen to corresponding slave commands, the master codec is configured to encode the corresponding slave commands, the master BLUETOOTH unit is configured to transmit the encoded slave commands to the slave BLUETOOTH unit, the slave codec is configured to decode the encoded slave commands, and the executing unit is configured to execute the corresponding slave commands.

2. The wireless conference system of claim 1, wherein the operation commands comprises opening, playing, or closing the conference document in the master device.

3. The wireless conference system of claim 2, wherein the corresponding slave command comprises opening, playing, or closing the copy of the conference document in the slave device.

4. The wireless conference system of claim 3, wherein the conference document is displayed on the master screen.

5. The wireless conference system of claim 4, wherein the copy of the conference document is displayed on the slave screen.

6. The wireless conference systems of claim 1, wherein the master user interface is configured to input a start command to start the master BLUETOOTH unit.

7. The wireless conference systems of claim 6, wherein the master BLUETOOTH unit is configured to generate a communication request.

8. The wireless conference systems of claim 7, wherein the slave user interface is configured to input a start command to start the slave BLUETOOTH unit and input an accepting command to accept the communication request when the slave BLUETOOTH unit receives the communication request, the slave BLUETOOTH unit is configured to receive the accepting command from the slave user interface and generate a response message corresponding to the communication request.

9. The wireless conference systems of claim 1, wherein the master codec is configured to encode the inquiring message into BLUETOOTH signals, and the slave codec is configured to encode the answer message into BLUETOOTH signals.

10. The wireless conference systems of claim 1, wherein the copy of the conference document saved in the slave memory unit is transmitted from the master device by the master BLUETOOTH unit and the slave BLUETOOTH unit.

11. The wireless conference systems of claim 1, wherein the master device is a computer.

12. The wireless conference systems of claim 1, wherein the slave device is a cell phone.

* * * * *